United States Patent [19]

Hinkle

[11] Patent Number: 5,314,314

[45] Date of Patent: May 24, 1994

[54] TWO-CYCLE ENGINE COMPRESSOR

[75] Inventor: Stanley J. Hinkle, Milford, Mich.

[73] Assignee: Detroit Diesel Corporation, Detroit, Mich.

[21] Appl. No.: 80,381

[22] Filed: Jun. 21, 1993

[51] Int. Cl.⁵ .............................. F04B 17/00
[52] U.S. Cl. .......................... 417/364; 417/380
[58] Field of Search ............... 60/609; 417/364, 380

[56] References Cited

U.S. PATENT DOCUMENTS

| | | | |
|---|---|---|---|
| 2,628,015 | 2/1953 | Neugebauer et al. | 417/364 |
| 3,204,859 | 9/1965 | Crooks | 417/364 |
| 4,480,968 | 11/1984 | Duerr | 417/380 |
| 4,496,291 | 1/1985 | Grimmer | 417/364 |
| 4,679,992 | 7/1987 | Watanabe et al. | 417/364 |

Primary Examiner—Michael Koczo
Attorney, Agent, or Firm—Brooks & Kushman

[57] ABSTRACT

Arrangements for engine compressor units are disclosed in which power cylinders operating on the two-stroke cycle are provided with charging air from a blower or other source which also provides charging air to two-cycle compressor cylinders via a separate turbocharging unit driven by the charging air and delivering more highly pressurized air to the compressor cylinders so as to increase compressor volumetric efficiency through the delivery of the precompressed inlet charges.

2 Claims, 1 Drawing Sheet 5,314,314

TWO-CYCLE ENGINE COMPRESSOR

TECHNICAL FIELD

This invention relates to engine driven air compressors and, more particularly, to two-cycle engine compressor units.

BACKGROUND ART

It is known in the art to Provide a two-stroke cycle air compressor having or more cylinders driven by an internal combustion engine also having one or more cylinders. The compressor and engine cylinders may be formed within a common frame, or crankcase, and have pistons connected to a common crankshaft and the engine cylinders may be operated on either a two or four-stroke cycle.

As shown in U.S. Pat. No. 4,480,968, the subject matter of which is incorporated herein by reference as a further teaching of the present invention, the engine and compressor are preferably housed in a common crankcase and utilize a common blower both to charge and scavenge the engine cylinders and to charge the compressor cylinders, thereby increasing their volumetric charging efficiency.

Engine compressor units may be made for example by modifying engines from a line of known two-cycle diesel engines having uniflow scavenging. The modified engines are provided with nonported cylinder liners and special cylinder heads in some of the cylinders preferably those of one bank of V-type engines, to operate on a two-stroke compressor cycle. Connection of the compressor cylinder head inlet ports with the engine air box allows using pressurized charging air from the engine blower for charging the compressor cylinders also. A turbocharger driven by exhaust from the engine cylinders may be mounted to provide compressed intake air to the charging blower.

SUMMARY OF THE INVENTION

The present invention contemplates use of a second turbocharger driven by the charging blower, or other means, to provide pressurized air to the compressor inlet, and further contemplates recycling air from the compressor outlet back through the second turbocharger inlet on a selectively controlled basis.

These and other features and advantages of the present invention will be more fully understood from the following description of certain preferred embodiments taken together with the accompanying drawing.

DETAILED DESCRIPTION

Figure 1:
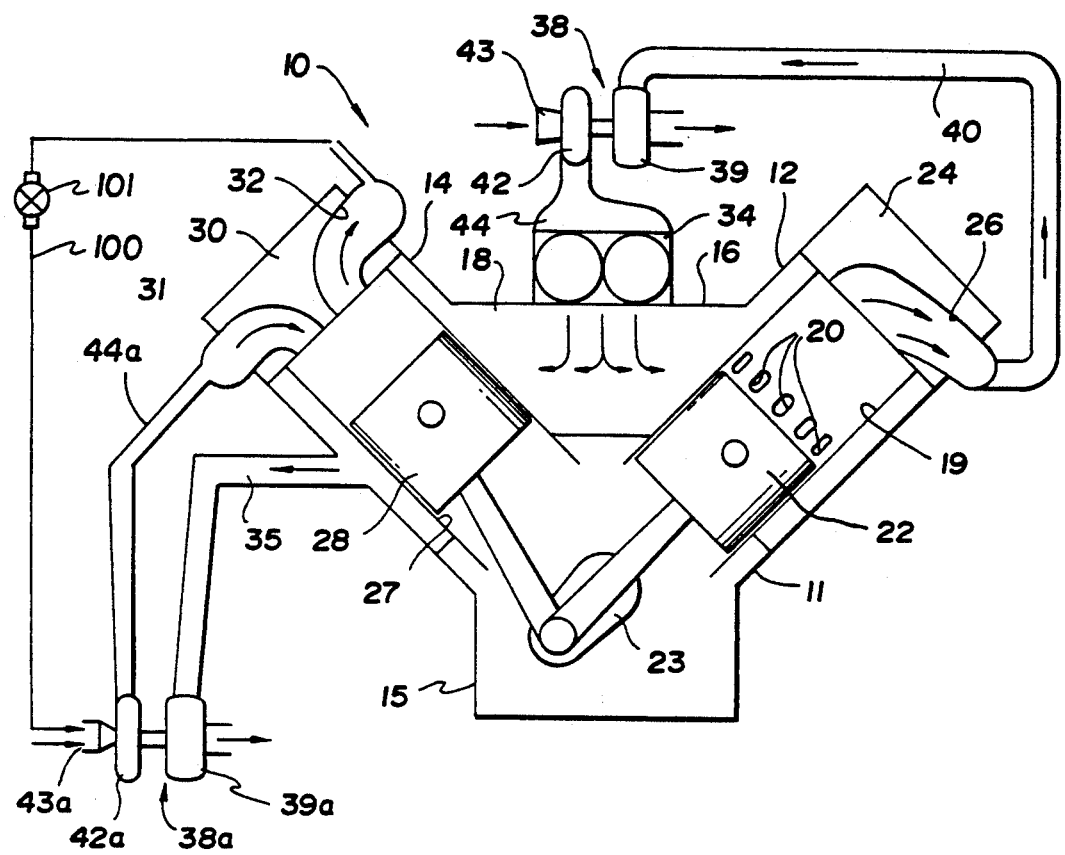
FIG. 1 is a partially schematic transverse cross-sectional view of a two-cycle engine compressor unit with a common charging blower including a turbocharger supplying compressed charging air to the blower and a second turbocharger for increasing the pressure of the incoming air to the compressor in accordance with the present invention.

In the drawing, numeral 10 generally indicates a two-stroke cycle (two-cycle) engine compressor unit formed in accordance with the invention. Engine compressor 10 includes a frame or crankcase 11 having a pair of cylinder banks 12,14 arranged in V-fashion and closed at their bottom ends by an oil pan 15. An upper wall 16 extending between the cylinder banks partially defines an air box, or charging air chamber 18 extending within the upper portion of the crankcase between and into the cylinder banks.

Cylinder bank 12 of the engine compressor includes a plurality of aligned cylinders 19, only one of which is shown, defined by cylinder liners which have is air inlet ports 20 intermediate their ends opening to the air box 18. Power pistons 22 are reciprocably disposed within the power cylinders 10 and are connected with a crankshaft 23 that is rotatably supported in the crankcase at the base of the V formed by the cylinder banks. The power pistons 22 are reciprocable within their respective cylinders 19 between top dead center positions near the outer end of the cylinder bank 12 and bottom dead center positions near the crankshaft. The reciprocating movement of the power piston 22 controls communication of the inlet ports with the interior of the cylinders so that the ports are open only when their respective pistons are at or near their bottom dead center positions.

A cylinder head 24, mounted on the cylinder bank 12, closes the ends of the power cylinders 19. The cylinder head 24 incorporates exhaust passages 26 and suitable exhaust valves and valve actuating gear, not shown, which operates in timed relation with crank rotation and piston reciprocation to provide operation of the power cylinders on a two-stroke power cycle in conventional fashion.

Cylinder bank 14, on the other hand, includes a plurality of compressor cylinders 27 defined by unported cylinder liners disposed in the cylinder bank 14, generally opposite power cylinders of the cylinder bank 12. Within the compressor cylinders 27 there are compressor pistons 28 which are likewise connected to the common crankshaft 23. The compressor pistons 28 are reciprocable within their respective cylinders 27 between a top dead center position located near the outer end of the cylinder bank 14 and a bottom dead center position located near the crankshaft 23.

A cylinder head 30, which may be of any known type suitable for use in a two-cycle compressor of the type described, is mounted on the outer end of the cylinder bank 14 and closes the ends of the compressor cylinders 27. Intake and discharge passage 31,32 are provided within the cylinder head 30 communicating with each of the compressor cylinders. Suitable intake and discharge valves, not shown, are also provided to allow the flow of intake air into the cylinders 27 through the intake passages 31 and the discharge of compressed air from the cylinders 27 through the discharge passages 32.

A charging air blower 34 of any suitable type, for example, the positive displacement lobed impeller Roots type, is mounted between the cylinder banks on the upper wall 16 of the engine. The blower 34 is operative to draw in ambient air from the engine exterior and discharge the air at a higher pressure level into the air box 18, the charging pressure partially depending upon the internal restriction to air flow through the engine compressor unit.

A connecting conduit 35 between the air box 18 and the compressor intake passages 31 provides communication for conducting pressurized air supplied by the charging blower 34 from the air box 18 to the compressor cylinder intake passages 31 for admission to the compressor cylinders 27. The cylinder inlet ports 20 f the power cylinders 19 permit the entry of air from the air box 18 into the power cylinders for scavenging and charging them whenever their respective power pistons 22 are in their bottom dead center positions. The power cylinders are further provided with suitable means, not shown, for delivering and burning fuel for the development of power in conventional fashion are preferably arranged for operation on the diesel cycle utilizing direct fuel injection.

A turbocharger 38 is provided on the engine compressor. That turbocharger includes a turbine 39 which is driven by exhaust gases conducted by a conduit 40 from the engine exhaust passage 26. The turbine drives a compressor 42 which receives ambient air through an inlet 43 and discharges it through a connecting duct 44 to the inlet of the charging blower 34.

In a preferred embodiment, an engine compressor unit of the type described may be formed by modifying a two-stroke cycle diesel engine of, for example, the Series 71 or 92 types manufactured by the Detroit Diesel Corporation. This may be accomplished, for instance, by converting one of the cylinder banks of a V-type engine to compressor operation by replacing the ported cylinder liners with unported liners and providing on that cylinder bank a cylinder head having conventional compressor inlet and outlet ports and valving, the inlet ports being connected through a suitable conduit with the engine air box.

In operation of an engine compressor in accordance with the embodiment of FIG. 1, fuel intermittently delivered to the power cylinders is ignited and burned, causing reciprocation of the power pistons on a two-stroke cycle. The operating cycle includes the admission of charging air from the air box through the intake ports 20 into the cylinders, compression of the air charges as the pistons move toward top dead center, delivery and burning of fuel near top dead center with expansion of the burned gases as the pistons move toward bottom dead center, and exhaust of the burned gases with scavenging and recharging of the cylinders as the pistons approach bottom dead center and compressed air from the air box flows through the intake ports into the cylinders.

The reciprocating movement of the power pistons 22 rotatably drives the crankshaft 23 which, in turn, reciprocates the compressor pistons 28 within their cylinders 27. On their downstrokes, the pistons allow the admission of charging air into their cylinders from the engine air box through the conduit 35 and intake passages 31. Thereafter, on their upstrokes, the pistons compress the air charges to the existing discharge pressure. The high pressure air is then discharged through the discharge passages 32 as the pistons continue to move toward their top dead center positions.

The initial precompression of the charging air by the charging blower 34 delivers a more dense charge of air into the compressor cylinders than would be the case if the cylinders were charged merely by the suction of the pistons drawing in ambient air. This provides a higher volumetric efficiency and greater mass flow through the compressor as well as a potentially higher outlet pressure, than would be the case without the delivery of precompressed air to the compressor cylinders.

The turbocharger is preferably matched with the engine to provide, at least under the higher load conditions of normal operation, inlet air to the blower at a charging pressure level substantially increased over ambient. This inlet air is then discharged through the blower into the engine air box at a high pressure level which may or may not be greater than that delivered by the turbocharger, depending upon the charging system design and engine operating conditions.

For best efficiency, the air box pressure at rated output may be substantially equal to that at the turbocharger discharge, since the compression efficiency of the turbocharger impeller is generally higher than that of the Roots type charging blower provided primarily for starting and low load operation of the engine. However, to maximize compressor flow, it may be preferable to use the blower to further increase the pressure of charging air delivered by the turbocharger. The increased pressure level of the air box due to operation of the turbocharger is, of course, available not only for providing a more dense charge and, therefore, potentially greater power from the engine power cylinders, but also inherently provides a more dense charge to the engine compressor cylinders with a resultant further increase in volumetric efficiency and potential maximum outlet pressure.

The connecting conduit 35 between air box 18 and compressor intake passages 31 includes a secondary turbocharger 38a identical to turbocharger 38. Pressurized air from conduit 35 drives a turbine 39a which drives a compressor 42a which receives ambient air, or pressurized air from an air screw compressor for example, through inlet 43a. The incoming air, now increased is in pressure through compressor 42, is delivered through conduit 44a to the compressor cylinder intake passages 31. Optionally, pressurized air from discharge passages 32 may be returned via line 100 to the inlet 43a and this recycling from the discharge passages 32 may be continued to a point of diminishing return, i.e. the point at which the increase in air pressure is insignificant. This point may be controlled by providing a cutoff control device 101 in line 100 blocking the recycling when the air in the discharge passages reaches a predetermined level.

While the best mode for carrying out the invention has been described in detail, those familiar with the art to which this invention relates will recognize various alternative designs and embodiments for practicing the invention as defined by the following claims.

What is claimed is:

1. A positive displacement multiple cylinder turbocharged engine compressor comprising:
    a frame defining an air chamber;
    a scavenging and charging air pump operative to provide pressurized charging and scavenging air to said air chamber;
    a turbocharger connected to the air pump to supply, when operative, more highly pressurized air to the air chamber;
    at least one power cylinder assembly including a power cylinder and a power piston reciprocable therein between top and bottom dead center positions on a two-stroke power cycle, said power cylinder having exhaust means at one end adjacent to the power piston top dead center position and air admission ports communicating said air chamber with the power cylinder interior, said ports being located for control by movement of the power piston to be open for admission of pressurized charging and scavenging air to the power cylinder only when the power piston is near its bottom dead center position, said exhaust means being connected with the turbocharger for driving the same when adequate exhaust energy is present;

at least one compressor cylinder assembly including a compressor cylinder and a compressor piston connected to be reciprocally driven by the power cylinder assembly between top and bottom dead center positions on a two-stroke compressor cycle, said compressor cylinder having admission and exhaust openings only at one adjacent to the top dead center position of the compressor piston;

a second turbocharger, said second turbocharger being connected to the admission opening of said compressor cylinder to supply air to the compressor cylinder at a pressure greater than that prevailing in the air chamber, said second turbocharger being driven by pressurized air in the air chamber;

whereby common air pump and turbocharger means supplying the air chamber provide pressurized air for scavenging and charging the power cylinder and for driving said second turbocharger and thereby providing highly pressurized precompressed charger to the compressor cylinder to increase compressor volumetric efficiency.

2. The engine of claim 1, further including air return line connected to said exhaust opening of the compressor cylinder and to second turbocharger whereby compressed air may be continuously cycled through the second turbocharger and the compressor cylinder assembly to raise the initially compressed air to increasingly greater levels of pressure, and a cut-off control means within said air return line for discontinuing the recycling of air through the air return line when the air pressure reaches a predetermined level.

* * * * *